(12) United States Patent
Uno

(10) Patent No.: US 11,343,425 B2
(45) Date of Patent: May 24, 2022

(54) CONTROL APPARATUS, CONTROL METHOD, AND STORAGE MEDIUM

(71) Applicant: CANON KABUSHIKI KAISHA, Tokyo (JP)

(72) Inventor: Shinichiro Uno, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 69 days.

(21) Appl. No.: 17/014,898

(22) Filed: Sep. 8, 2020

(65) Prior Publication Data

US 2020/0404162 A1    Dec. 24, 2020

Related U.S. Application Data

(63) Continuation of application No. PCT/JP2019/009051, filed on Mar. 7, 2019.

(30) Foreign Application Priority Data

Mar. 13, 2018   (JP) .............................. JP2018-045957

(51) Int. Cl.
*H04N 5/232* (2006.01)
*H04N 13/282* (2018.01)

(52) U.S. Cl.
CPC ..... *H04N 5/23216* (2013.01); *H04N 5/23299* (2018.08); *H04N 13/282* (2018.05)

(58) Field of Classification Search
CPC ........... H04N 5/23216; H04N 5/23299; H04N 5/23212; H04N 5/247; H04N 5/232127; H04N 5/23218; H04N 5/238; H04N 13/282; H04N 13/296; H04N 13/243; H04N 13/239; H04N 7/181; G03B 37/04; G03B 13/30; G03B 13/36; G03B 2206/00
(Continued)

(56) References Cited

U.S. PATENT DOCUMENTS

| 5,714,997 A | 2/1998 | Anderson |
| 8,139,935 B2* | 3/2012 | Pace ...................... G03B 35/00 396/325 |

(Continued)

FOREIGN PATENT DOCUMENTS

| JP | 2014182248 A | 9/2014 |
| JP | 2014215828 A | 11/2014 |

(Continued)

*Primary Examiner* — Pritham D Prabhakher
(74) *Attorney, Agent, or Firm* — Canon U.S.A., Inc. IP Division

(57) ABSTRACT

A control apparatus 220 controls the in-focus positions of a plurality of image capturing apparatuses that perform image capturing from a plurality of directions in order to generate a virtual-viewpoint image. Specifically, the control apparatus 220 obtains an image capture parameter related to image capturing by one or more image capturing apparatuses included in an image capturing apparatus group 100. The control apparatus 220 controls on the basis of the obtained image capture parameter, the in-focus position of a target image capturing apparatus corresponding to the image capture parameter such that the distance from the target image capturing apparatus to the in-focus position of the target image capturing apparatus is shorter than the distance from the target image capturing apparatus to a point of interest.

19 Claims, 19 Drawing Sheets

(58) Field of Classification Search
USPC .......................................................... 348/262
See application file for complete search history.

(56) References Cited

U.S. PATENT DOCUMENTS

| | | | |
|---|---|---|---|
| 9,789,401 B2* | 10/2017 | Harada | A63F 13/56 |
| 9,888,229 B2* | 2/2018 | Meng | G06T 7/557 |
| 10,569,172 B2* | 2/2020 | Yee | G06F 3/04883 |
| 10,944,960 B2* | 3/2021 | Matsunobu | H04N 13/117 |
| 11,200,690 B2* | 12/2021 | Morisawa | G06T 17/00 |
| 2003/0210329 A1 | 11/2003 | Aagaard et al. | |
| 2011/0243543 A1 | 10/2011 | Pace | |
| 2015/0358542 A1* | 12/2015 | Sato | G06T 5/50 |
| | | | 348/239 |
| 2015/0373316 A1* | 12/2015 | Meng | H04N 13/282 |
| | | | 348/47 |
| 2016/0220905 A1* | 8/2016 | Harada | A63F 13/5258 |
| 2016/0379682 A1* | 12/2016 | Williams | H04N 21/4333 |
| | | | 386/278 |
| 2017/0070656 A1* | 3/2017 | Park | H04N 5/23296 |
| 2017/0332067 A1* | 11/2017 | Ichihara | H04N 5/232133 |
| 2018/0184072 A1* | 6/2018 | Yoshimura | G06T 7/248 |
| 2018/0204381 A1* | 7/2018 | Kanatsu | H04N 5/247 |

FOREIGN PATENT DOCUMENTS

| | | |
|---|---|---|
| JP | 2017184043 A | 10/2017 |
| JP | 2017212593 A | 11/2017 |

\* cited by examiner

CONTROL APPARATUS, CONTROL METHOD, AND STORAGE MEDIUM

CROSS-REFERENCE TO RELATED APPLICATIONS

This application is a Continuation of International Patent Application No. PCT/JP2019/009051, filed Mar. 7, 2019, which claims the benefit of Japanese Patent Application No. 2018-045957, filed Mar. 13, 2018, both of which are hereby incorporated by reference herein in their entirety.

BACKGROUND

Field

The present disclosure relates to a technique for generating a virtual-viewpoint image by using a plurality of cameras.

Background Art

In the related art, a technique in which image capturing of a subject is performed by a plurality of cameras installed at different positions from a plurality of directions in synchronization with one another and a plurality of captured images (multi-view images) obtained by the image capturing are used to generate a virtual-viewpoint image has been proposed. The virtual-viewpoint image thus generated is an image that represents a view at a virtual viewpoint that is not limited by the installation positions of the cameras.

Japanese Patent Laid-Open No. 2014-215828 discloses a technique in which a three-dimensional model is generated on the basis of images obtained by image capturing of a subject from a plurality of directions using a plurality of cameras and texture is attached to the generated three-dimensional model to generate a virtual-viewpoint image corresponding to a viewpoint specified by a user.

In a case of generating a virtual-viewpoint image of a predetermined area by using captured images obtained by a plurality of cameras, a virtual-viewpoint image of high image quality can be generated when the predetermined area is included in the common part of the in-focus ranges (ranges in focus) of the respective cameras. However, in a case where the common part of the in-focus ranges of the respective cameras are small, an area, in the generated virtual-viewpoint image, not included in the common part is large, and the image quality of the virtual-viewpoint image may be compromised.

The present disclosure has been made in view of the above-described issue, and an object thereof is to make it possible to generate a virtual-viewpoint image of high image quality by performing control such that the common part of the in-focus ranges of a plurality of cameras is enlarged.

SUMMARY

To address the above-described issue, a control apparatus according to the present disclosure has, for example, the following configuration. That is, the control apparatus is a control apparatus for controlling a plurality of image capturing apparatuses that perform image capturing from respective different directions in order to generate a virtual-viewpoint image corresponding to a specified viewpoint, including: an obtaining unit configured to obtain an image capture parameter related to image capturing by one or more image capturing apparatuses included in the plurality of image capturing apparatuses; and a control unit configured to control on the basis of the image capture parameter obtained by the obtaining unit, an in-focus position, on an optical axis, of a target image capturing apparatus corresponding to the image capture parameter such that a distance from the target image capturing apparatus to the in-focus position of the target image capturing apparatus is shorter than a distance from the target image capturing apparatus to a position that is on the optical axis of the target image capturing apparatus and that is closest to optical axes of the other image capturing apparatuses included in the plurality of image capturing apparatuses.

Further features of the present disclosure will become apparent from the following description of exemplary embodiments with reference to the attached drawings.

BRIEF DESCRIPTION I/F THE DRAWINGS

DESCRIPTION OF THE EMBODIMENTS

[System Configuration]

Figure 2:
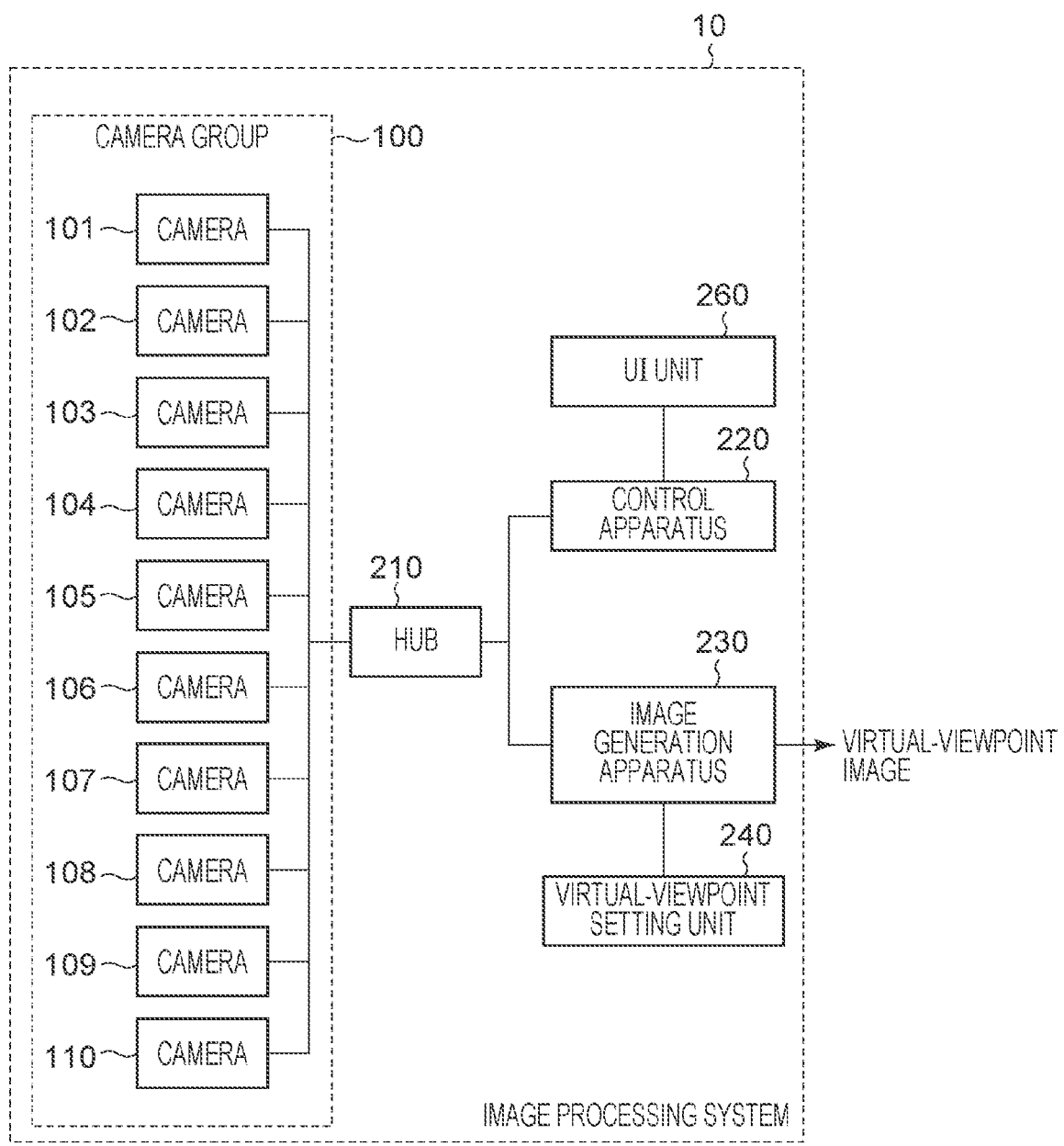
FIG. 2 is a diagram illustrating a configuration of an image processing system according to an embodiment.

FIG. 2 illustrates an example configuration of an image processing system 10 that generates a virtual-viewpoint image in the present embodiment. The image processing system 10 includes a camera group 100 including a plurality of cameras 101 to 110, a hub 210, a UI (user interface) unit 260, a control apparatus 220, an image generation apparatus 230, and a virtual-viewpoint setting unit 240.

Figure 1:
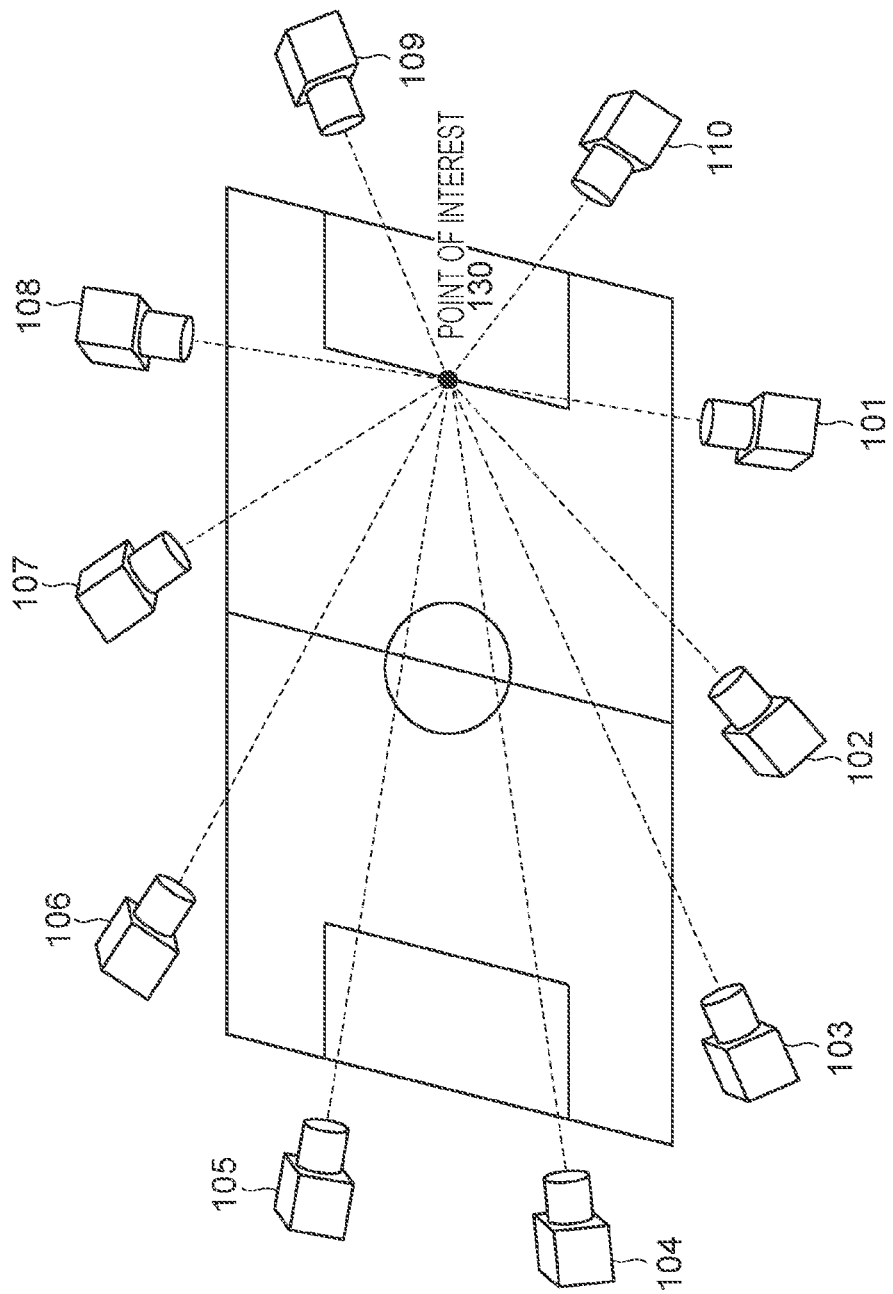
FIG. 1 is a diagram illustrating an example arrangement of a plurality of cameras.

An example arrangement of the cameras included in the camera group 100 is illustrated in FIG. 1. The plurality of cameras are arranged so as to surround a sports field that is a target of image capturing, and all the cameras are pointed at the same point of interest 130 and perform image capturing from respective different directions to obtain a plurality of captured images, which are used to generate a virtual-viewpoint image. A point of interest in the present embodiment is a point at which the optical axes of the plurality of cameras intersect, that is, a point that corresponds to the center of the captured images captured by the plurality of cameras. However, the optical axes of all the cameras need not intersect at the point of interest, and the point of interest needs to be included in at least the captured images captured by the plurality of cameras. That is, a position that is on the optical axis of a certain camera and that is closest to the optical axes of the other cameras is the point of interest of the camera. Each camera included in the camera group 100 is, for example, a digital camera and may be a camera capturing still images, a camera capturing moving images, or a camera capturing both still images and moving images. In the present embodiment, a description is given on the assumption that the term "image" is a term that includes a still image and a moving image unless otherwise noted. Note that in the present embodiment, a combination of an image capturing unit including an image sensor and a lens for concentrating light rays on the image sensor is called a camera. The image processing system 10 uses images captured by the camera group 100 to generate a virtual-viewpoint image of a scene occurring near the point of interest 130.

Note that in the present embodiment, a case where one point of interest is present is mainly described for simplification; however, the present embodiment is not limited to this, and a plurality of points of interest may be present. That is, some of the cameras included in the camera group 100 may point at a first point of interest and perform image capturing, and the remaining cameras may point at a second point of interest different from the first point of interest and perform image capturing. The number of cameras included in the camera group 100 is not limited to ten, and more than one camera needs to be included. Further, the camera group 100 need not surround the point of interest 130 from all directions. The installation place of the camera group 100 is not limited to a sports field and may be, for example, a theater or a live-performance stage.

Images captured by the camera group 100 are sent to the control apparatus 220 and the image generation apparatus 230 via the hub 210. The control apparatus 220 accepts an instruction via the UI unit 260 and controls each camera included in the camera group 100. Specifically, the UI unit 260 includes a display unit that displays a GUI (graphical user interface) for operations and an operation unit, such as a mouse, a keyboard, an operation button, or a touch panel, and accepts operations by a user. The control apparatus 220 obtains from the UI unit 260 information corresponding to a user operation and transmits to each camera on the basis of the information, for example, a change instruction for changing an image capture parameter related to image capturing or a change instruction for changing the image capture position and image capture direction. The image capture parameter in the present embodiment includes, for example, at least one of the zoom value, the focus value, and the aperture value of the camera. However, the content of the image capture parameter is not limited to these. Each camera changes the image capture parameter in accordance with an instruction received from the control apparatus 220. In a case where, for example, each camera has a motor-driven pan head, the pan head is controlled in accordance with an instruction from the control apparatus to change the image capture position and image capture direction of the camera.

The image generation apparatus 230 generates a virtual-viewpoint image in accordance with the position and direction of a virtual viewpoint set by the virtual-viewpoint setting unit 240. Specifically, the virtual-viewpoint setting unit 240 sets a virtual viewpoint specified on the basis of a user operation or a virtual viewpoint automatically specified. The image generation apparatus 230 performs on the basis of a plurality of captured images obtained from the camera group 100, a foreground-background separation process for separating a predetermined object area and the other area in each image to generate a 3D model from a separated foreground image. The image generation apparatus 230 obtains viewpoint information indicating the position and orientation of the specified virtual viewpoint from the virtual-viewpoint setting unit 240 and performs a rendering process using the 3D model in accordance with the specified virtual viewpoint to generate a virtual-viewpoint image that represents a view at the virtual viewpoint. A virtual-viewpoint image in the present embodiment includes a desired-viewpoint image (free-viewpoint image) corresponding to a viewpoint specified by the user as desired. Further, an image corresponding to a viewpoint specified by the user from among a plurality of candidates and an image corresponding to a viewpoint automatically specified by the apparatus are also included in the virtual-viewpoint image.

In the process for generating a virtual-viewpoint image from captured images as described above, a known method, such as Visual Hull, can be used. Note that the algorithm for generating a virtual-viewpoint image is not limited to this, and a method, such as a billboard-based method, in which a 3D model is not created may be used. The generated virtual-viewpoint image is transmitted to, for example, a viewing terminal (not illustrated) held by a viewer, and the virtual-viewpoint image is displayed on the terminal.

Note that the configuration of the image processing system 10 is not limited to that illustrated in FIG. 2. The plurality of cameras included in the camera group 100 may be directly connected to the control apparatus 220 or the image generation apparatus 230, or the cameras may be daisy-chained. The image generation apparatus 230 may be formed as a single apparatus or may be formed of a plurality of apparatuses connected to one another. The control apparatus 220 may include the UI unit 260, or the control apparatus 220 and the image generation apparatus 230 are formed as one apparatus. The apparatuses included in the image processing system 10 may be connected to one another by wire or wirelessly.

Figure 19:
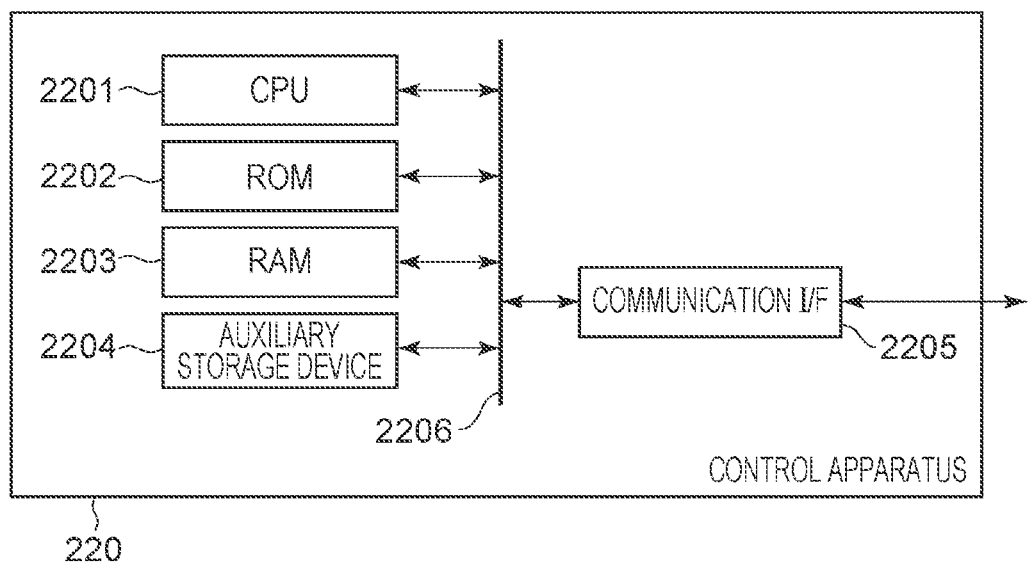
FIG. 19 is a diagram illustrating a hardware configuration of the control apparatus.

FIG. 19 illustrates an example hardware configuration of the control apparatus 220. The control apparatus 220 includes a CPU 2201, a ROM 2202, a RAM 2203, an auxiliary storage device 2204, a communication I/F 2205, and a bus 2206. The CPU 2201 uses a computer program and data stored in the ROM 2202 or the RAM 2203 to control the control apparatus 220 as a whole. Note that the control apparatus 220 may include one or more dedicated hardware components different from the CPU 2201, and the dedicated hardware components may perform at least part of the processing by the CPU 2201. Examples of the dedicated hardware components include an ASIC (application-specific integrated circuit), an FPGA (field-programmable gate array), and a DSP (digital signal processor). The ROM 2202 stores programs and parameters that need not be changed. The RAM 2203 temporarily stores, for example, programs and data supplied from the auxiliary storage device 2204 and data externally supplied via the communication I/F 2205. The auxiliary storage device 2204 is formed of, for example, a hard disk drive and stores various types of content data including images and sounds.

The communication I/F 2205 is used to communicate with external apparatuses, such as the camera group 100 and the image generation apparatus 230. For example, in a case where the control apparatus 220 is connected to an external apparatus by wire, a communication cable is connected to the communication I/F 2205. In a case where the control apparatus 220 has a function of wirelessly communicating with external apparatuses, the communication I/F 2205 includes an antenna. The bus 2206 connects the units of the control apparatus 220 to convey information. Note that in a case where the control apparatus 220 includes the UI unit 260, the control apparatus 220 includes the display unit and the operation unit in addition to the configuration illustrated in FIG. 19. The hardware configuration of the image generation apparatus 230 is similar to the configuration of the control apparatus 220.

Figure 3:
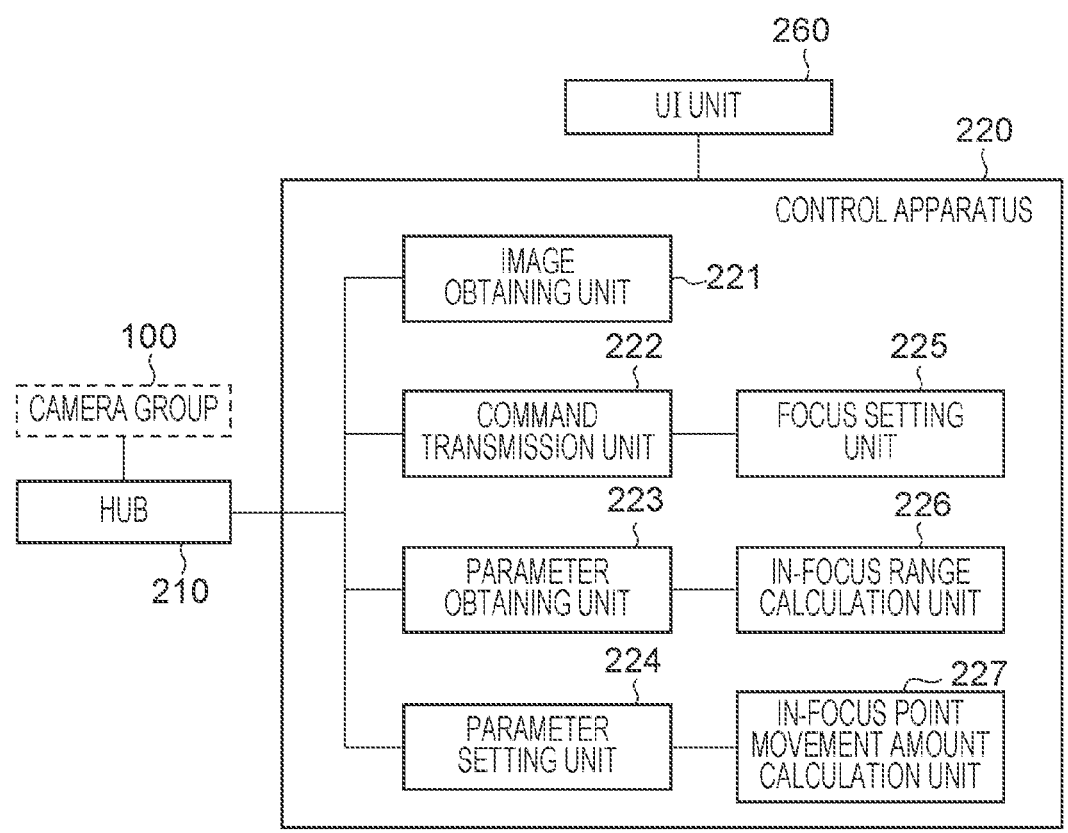
FIG. 3 is a diagram illustrating a functional configuration of a control apparatus according to the embodiment.

The functional configuration of the control apparatus 220 is described with reference to FIG. 3. An image obtaining unit 221 obtains and transmits to the UI unit 260 an image based on image capturing by each camera. A user performs an operation while watching an image displayed by the UI unit 260 to give an instruction for adjusting the position and orientation of each camera or specify an adjustment of the focus of the camera. A command transmission unit 222 transmits commands to each camera and transmits a command for starting or ending image capturing and a command for, for example, controlling an in-focus position (in-focus point) on which the camera is focused or controlling the zoom value or the aperture value of the camera. A focus setting unit 225 sets the in-focus point of each camera to a desired place and can set the in-focus point in an area away from the center of the captured image.

A parameter obtaining unit 223 obtains from each camera, a parameter, such as the current zoom value, focus value, or aperture value, related to image capturing and may obtain as the focus value not only the focus encoder value of the lens but also the contrast value of a focus area. An in-focus range calculation unit 226 calculates a range in focus (in-focus range) in the front and the rear of the in-focus point on the basis of the parameter obtained by the parameter obtaining unit 223. An in-focus point movement amount calculation unit 227 performs, in a case of changing the in-focus point of a camera, a calculation for converting the amount of movement of the in-focus point to the amount of movement of the focal length of the lens. A parameter setting unit 224 sets the amount of movement of the focal length as the focus encoder value and changes the focus value of the camera by command transmission by the command transmission unit 222. Note that the parameter setting unit 224 may set not only the focus value but also the zoom value and the aperture value.

[Control of in-Focus Point]

Figure 4:
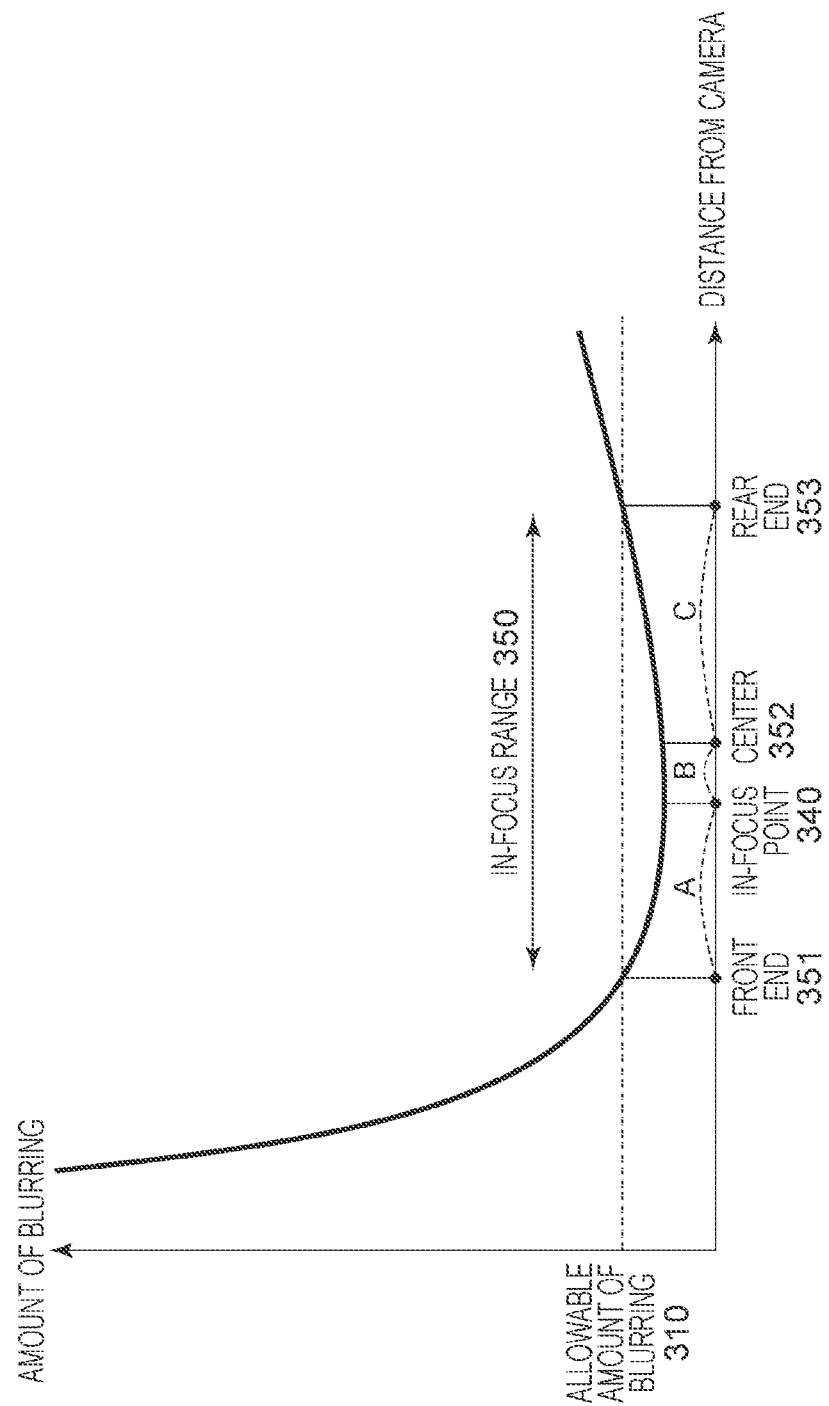
FIG. 4 is a diagram illustrating a relationship between an in-focus point and the amount of bluffing.

Before giving a description of a procedure for controlling an in-focus point in the present embodiment, the in-focus point and the amount of blurring are described. FIG. 4 is a diagram illustrating a relationship between the distance from a camera and the amount of bluffing in a case where the aperture value and the in-focus point are fixed. For example, in a case where a camera is focused on a specific subject, the position of the subject is an in-focus point 340. At this time, the amount of blurring steeply increases as the distance from the camera changes in the direction from the in-focus point 340 toward the camera side (the leftward direction in FIG. 4), and the amount of bluffing gently increases in the direction away from the camera (the rightward direction in FIG. 4). When an amount of bluffing that does not significantly affect the image quality of a virtual-viewpoint image generated from captured images is defined as an allowable amount of bluffing 310, an area that is in focus (an area in which the amount of blurring is smaller than or equal to the allowable amount of bluffing 310) is an in-focus range 350. The size of the in-focus range corresponds to, for example, the depth of field of the camera. The distance from the front end 351 of the in-focus range 350 to the in-focus point 340 is A, the distance from the rear end 353 to the in-focus point 340 is B+C, and the center 352 of the in-focus range 350 is at a position further from the camera than the in-focus point 340. Note that the length of A+B is equal to C.

Figure 5:
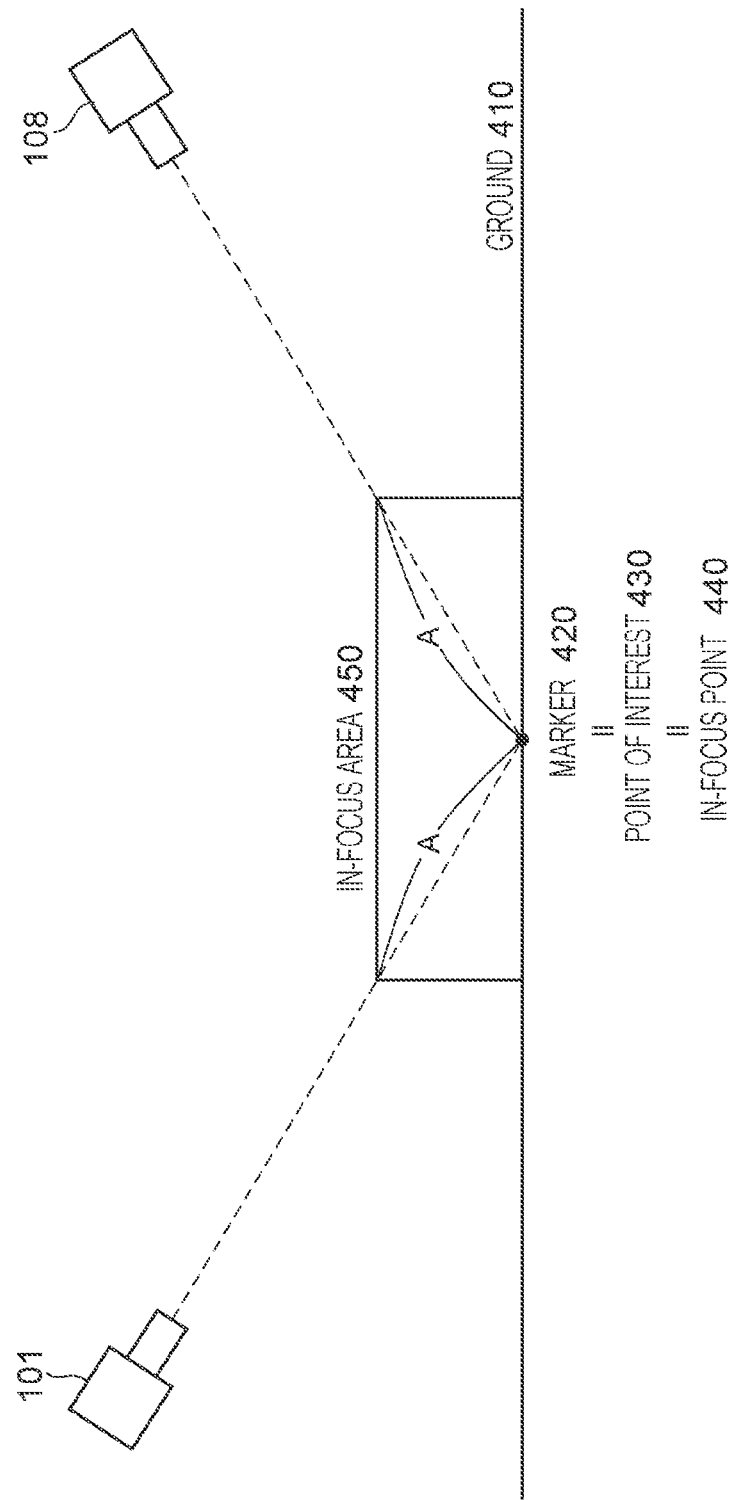
FIG. 5 is a diagram illustrating an in-focus area when a point of interest is set at an in-focus point.

FIG. 5 illustrates a case where cameras are pointed at a marker 420 placed on the ground as a point of interest 430 and are focused on the marker 420 to set an in-focus point 440. That is, the marker 420, the point of interest 430, and the in-focus point 440 are at the same position. For simplification, a description is given below while focusing on the camera 101 and the camera 108 arranged opposite to each other in the camera group 100; however, the same applies to the other cameras pointed at the same point of interest. In the situation illustrated in FIG. 5, the in-focus range of each camera is larger in a part on the far side of the in-focus point than in a part on the near side of the in-focus point, and therefore, an in-focus area 450 that is the common part of the in-focus range of the camera 101 and the in-focus range of the camera 108 is an area up to a position away from the point of interest 430 toward each camera by a distance A. The in-focus area 450 might not have an exact rectangular shape but is represented here by a rectangle for simplification of description. Note that in a case where the distances from the point of interest 430 to the respective cameras are different, the distance A has different values for the respective cameras.

Figure 6:
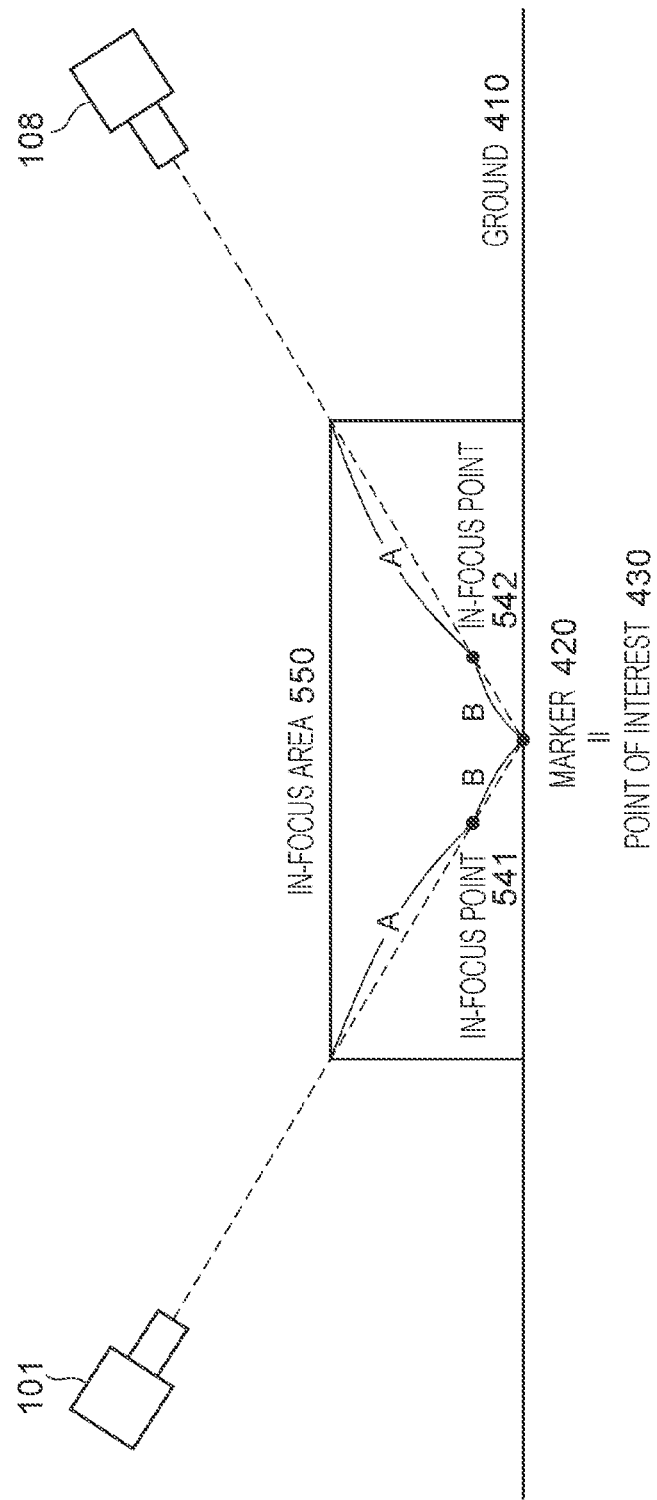
FIG. 6 is a diagram illustrating an in-focus area when in-focus points are changed to the near side.

FIG. 6 illustrates a case where the in-focus point of each camera is moved closer to the camera side than the point of interest 430 in order to enlarge the in-focus area. The camera 101 is focused on an in-focus point 541, and the camera 108 is focused on an in-focus point 542. At this time, an in-focus area 550 is an area up to a position away from the point of interest 430 toward each camera by a distance A+B and is larger than the area in the case where the in-focus point matches the point of interest 430 illustrated in FIG. 5. Note that in the case where the distances from the point of interest 430 to the respective cameras are different, the distance B from the point of interest 430 to each in-focus point has different values for the respective cameras.

Figure 7:
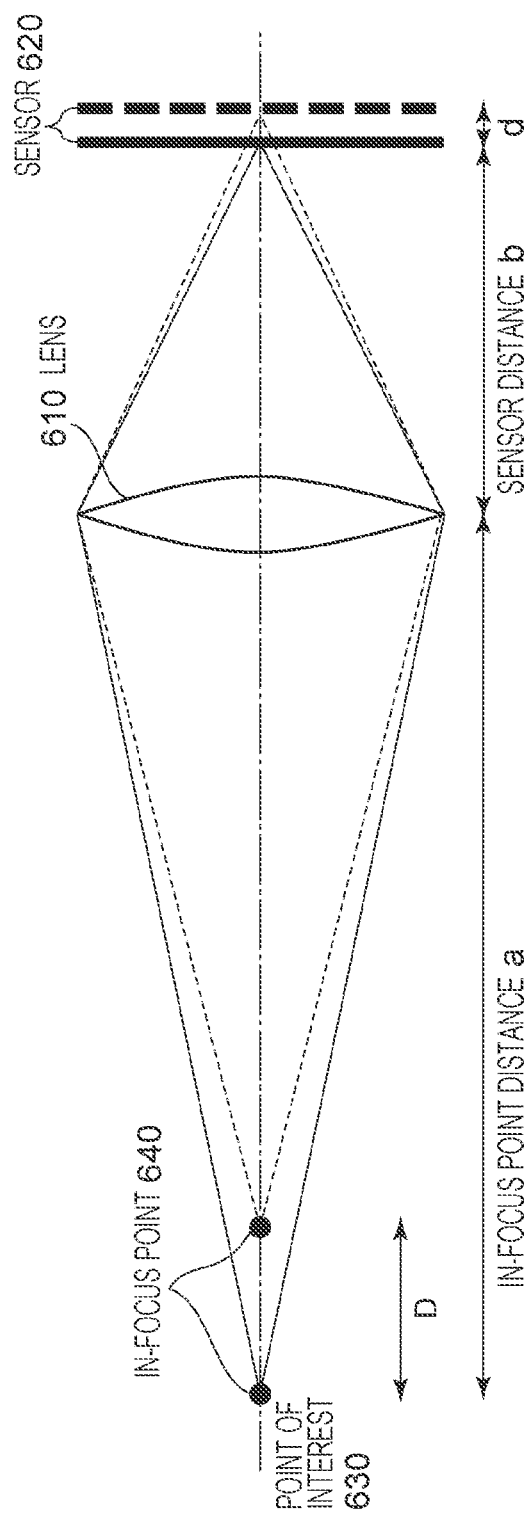
FIG. 7 is a diagram illustrating a relationship between a focal length and an in-focus point.

A method for moving an in-focus point is described with reference to FIG. 7. For the distance a from a lens 610 of a camera to an in-focus point 640 and the distance b from the lens 610 to a sensor 620, a relational expression of $1/a+1/b=1/f$ holds where f is the distance (focal length) from the lens 610 to a position at which an image is formed when parallel rays are incident on the lens 610. At this time, when the position of the sensor 620 on which an image is formed is moved by d relative to the lens, the in-focus point 640 moves by D. That is, when the amount of movement D of the in-focus point 640 to be moved is determined, the amount of movement d of the sensor 620 can be calculated. Note that in actuality, the lens 610 is moved relative to the sensor 620 instead of moving the sensor 620 relative to the lens 610. FIG. 7 illustrates a single lens, namely, the lens 610, for simplification; however, in actuality, a plurality of lenses are combined and the positions thereof are controlled to change the focal length and the zoom value.

Figure 8:
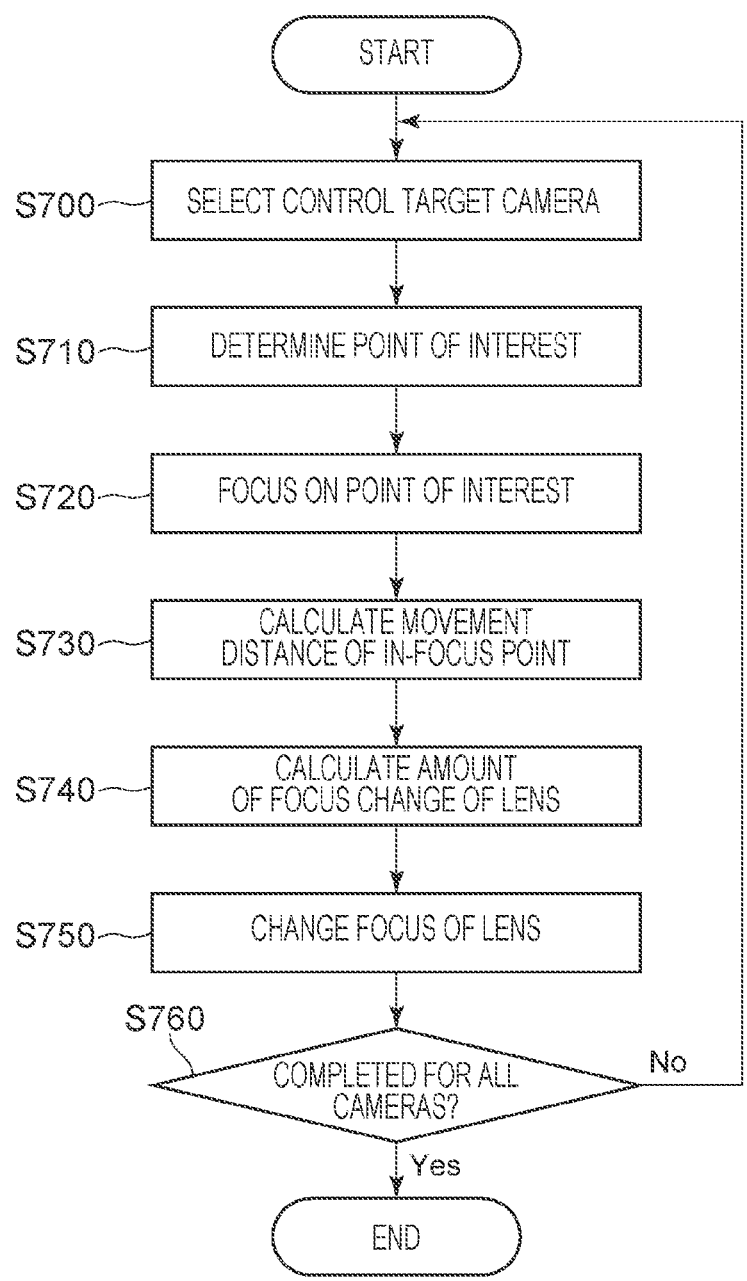
FIG. 8 is a flowchart for describing operations of the control apparatus when an in-focus point is changed to the near side.

Now, operations of the control apparatus 220 in a case of moving an in-focus point from a point of interest to the near side to enlarge an in-focus area are described with reference to the flowchart in FIG. 8. The processing illustrated in FIG. 8 is started at the timing when the camera group 100 is installed and an instruction for making an adjustment of the camera group 100 before generation of a virtual-viewpoint image is input to the control apparatus 220. The instruction for making the adjustment may be given by a user operation via the UI unit 260, or the instruction may be input from another apparatus. Note that the timing of starting the processing illustrated in FIG. 8 is not limited to this. The processing illustrated in FIG. 8 is implemented by the CPU 2201 loading to the RAM 2203 and executing a program stored in the ROM 2202. Note that at least part of the processing illustrated in FIG. 8 may be implemented as one or more dedicated hardware components different from the CPU 2201. The same applies to processing illustrated in the flowcharts in FIG. 13, FIG. 16, and FIG. 18 described below.

In S700, the control apparatus 220 selects a target camera that is to be a control target from the camera group 100 and obtains the image capture parameter from the target camera. In S710, the command transmission unit 222 gives an instruction for determining a point of interest and pointing the target camera at the point of interest. For example, a predetermined object, such as a 2D marker, for setting a point of interest is placed in a sports field that is a target of image capturing. The UI unit 260 accepts a user operation for specifying the position of the marker located within the image capture range of a camera, and the parameter obtaining unit 223 obtains coordinate information corresponding to the specification. The parameter setting unit 224 sets a parameter for adjusting at least either the position or orientation of the target camera on the basis of the obtained coordinate information such that the position of the point of interest matches the position of the marker. The command transmission unit 222 transmits an instruction corresponding to the set parameter to the target camera. When the point of interest is thus set by using the marker, time taken to point the plurality of cameras included in the camera group 100 at the same point of interest can be saved. Note that the point of interest may be determined in accordance with a position specified by the user as desired regardless of the marker position. The control apparatus 220 may detect the marker position or a predetermined feature point in a captured image obtained by the image obtaining unit 221 by making an image analysis and automatically determine a point of interest. The point of interest of the target camera may be determined so as to match the direction in which a camera other than the target camera is pointed.

In S720, the command transmission unit 222 gives an instruction for focusing the target camera on the point of interest on the basis of setting by the focus setting unit 225. In S730, the in-focus point movement amount calculation unit 227 calculates the amount of movement of the in-focus point from the point of interest on the basis of the image capture parameter of the target camera such that the distance from the target camera to the in-focus point is shorter than the distance from the target camera to the point of interest. Specifically, the in-focus range calculation unit 226 calculates the in-focus range in the front and the rear of the in-focus point on the basis of the image capture parameter of the target camera obtained by the parameter obtaining unit 223, and the in-focus point movement amount calculation unit 227 calculates the amount of movement of the in-focus point from the point of interest such that the point of interest is at the center of the in-focus range. In S740, the in-focus point movement amount calculation unit 227 calculates the amount of focus change of the lens from the amount of movement of the in-focus point. In S750, the command transmission unit 222 transmits to the target camera an adjustment parameter corresponding to the calculated amount of focus change to thereby give an instruction for changing the in-focus point of the target camera. In the control of the in-focus point, control is performed such that the center of the in-focus range of the target camera corresponds to the point of interest. When the in-focus point is thus set, the size of the common part of the in-focus ranges of a plurality of cameras (the in-focus area 550 in FIG. 6) can be maximized. However, the control is not limited to this, and control may be performed such that the in-focus point is at a position closer to the target camera than the point of interest. When control is performed such that the point of interest is included in the in-focus range of the target camera, a virtual-viewpoint image including the vicinity of the point of interest can be generated with high image quality.

In S760, the control apparatus 220 checks whether the processing from S710 to S750 is completed for all cameras included in the camera group 100. If the processing is not completed for all cameras, the flow returns to S700, and the control apparatus 220 selects a camera for which the processing is not yet performed as a control target camera. On the other hand, if the processing is completed for all cameras, the processing in FIG. 8 ends. Note that the case where the control apparatus 220 controls all cameras is described here; however, the control is not limited to this. The control apparatus 220 may perform the processing from S710 to S750 for some of the cameras included in the camera group 100.

In the description given above with reference to FIG. 8, the in-focus point of the target camera is controlled such that the in-focus point of the target camera matches the position of the marker, and subsequently, the in-focus point of the target camera is controlled such that the in-focus point comes closer to the target camera. With such a method, the in-focus point is adjusted with reference to the position of the marker included in common in the image capture ranges of the plurality of cameras, and therefore, the in-focus points of the plurality of cameras can be automatically adjusted with precision. However, the procedure for controlling the in-focus points is not limited to this. For example, the control apparatus 220 may obtain position information of the marker and position information of the target camera and directly set on the basis of these pieces of position information, the in-focus point at a position closer to the target camera than the marker without focusing on the marker. The control apparatus 220 may move the position of the target camera in the direction opposite to the image capture direction instead of bringing the in-focus point of the target camera closer to the target camera to thereby perform control such that the in-focus point comes closer to the target camera than the point of interest.

As described with reference to FIG. 6 to FIG. 8, the control apparatus 220 according to the present embodiment controls the in-focus positions of the plurality of cameras that perform image capturing from respective different directions in order to generate a virtual-viewpoint image corresponding to a specified viewpoint. Specifically, the control apparatus 220 obtains an image capture parameter related to image capturing by one or more cameras included in the camera group 100. The control apparatus 220 controls the in-focus position of a target camera corresponding to the obtained image capture parameter on the basis of the image capture parameter such that the distance from the target camera to the in-focus position of the target camera is shorter than the distance from the target camera to the point of interest. Accordingly, the in-focus area that is the common part of the in-focus ranges of the respective cameras included in the camera group 100 can be enlarged, and a virtual-viewpoint image of an image capture area in the vicinity of the point of interest can be generated with high image quality by using captured images obtained by the camera group 100.

Figure 9:
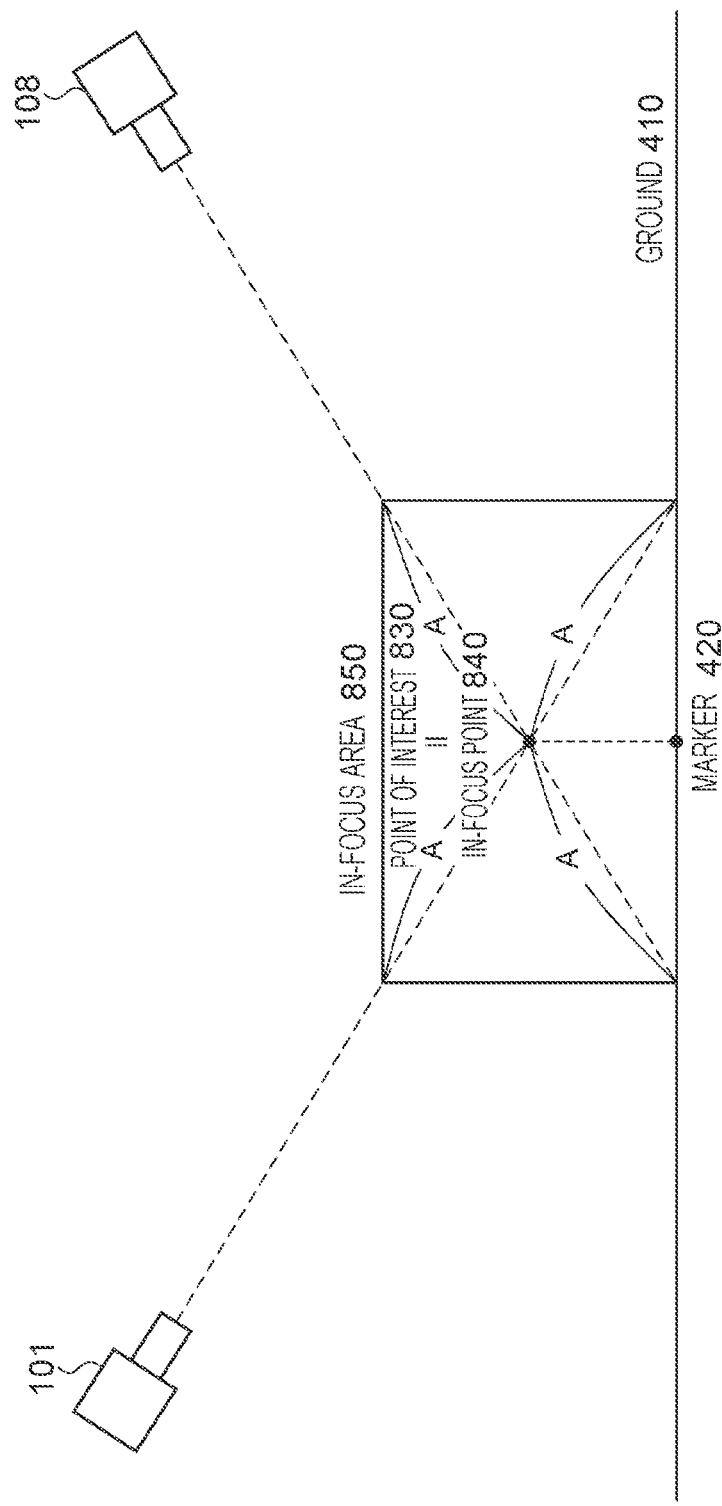
FIG. 9 is a diagram illustrating an in-focus area when a point of interest is set in the air.
Figure 10:
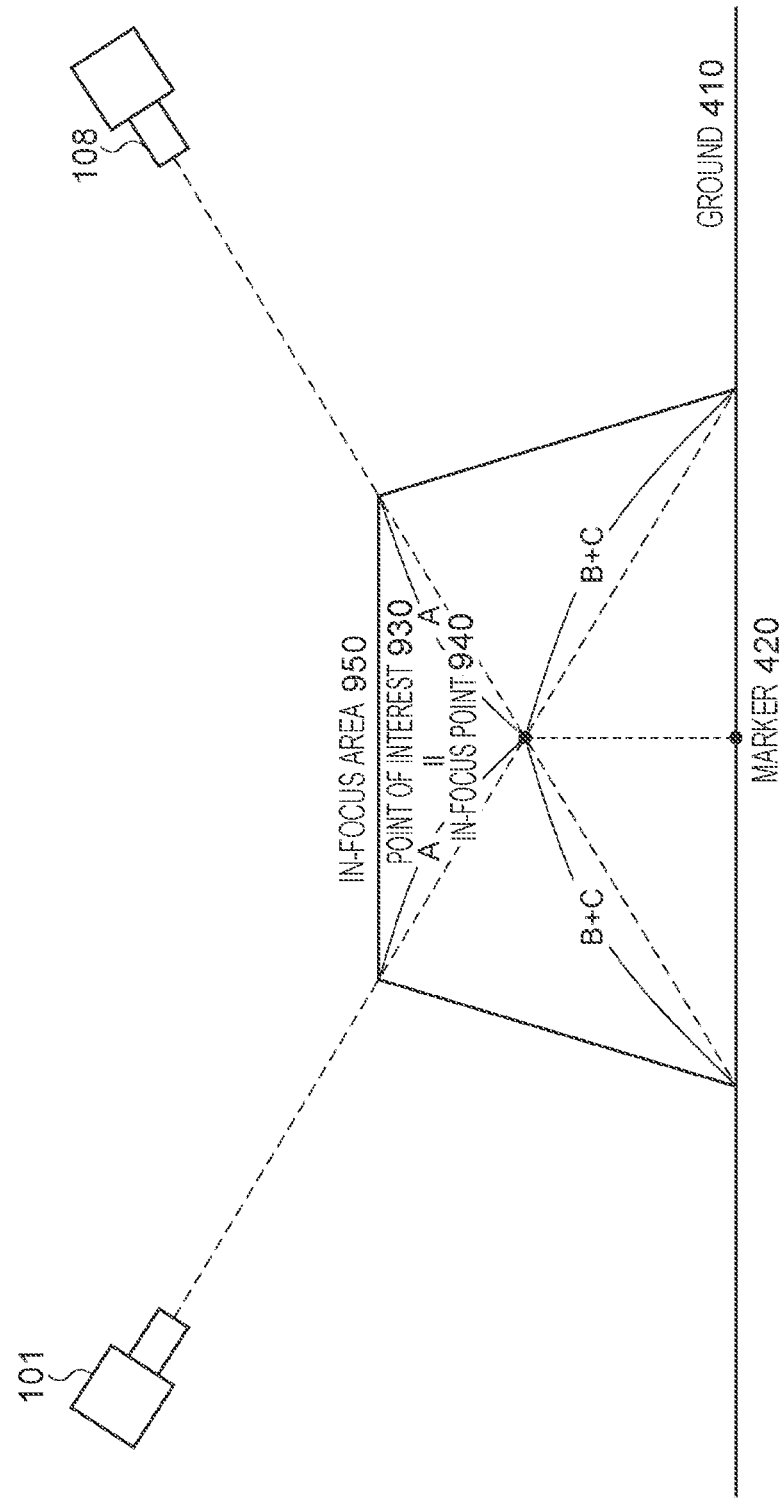
FIG. 10 is a diagram illustrating an in-focus area when a point of interest is set in the air.

Now, a method for enlarging an in-focus area by setting a point of interest in the air is described. As illustrated in FIG. 5, in the case where the marker 420 placed on the ground is set as the point of interest 430 and the position of the point of interest 430 is set as the in-focus point 440, a part of the in-focus area on the side further from the camera than the in-focus point is present below ground, and therefore, it is not possible to effectively use the entire in-focus area. An example where an in-focus area that can be effectively used (is present above the ground) is enlarged by setting a point of interest in the air is illustrated in FIG. 9. In the example illustrated in FIG. 9, the positions and orientations of the plurality of cameras are adjusted such that the position of a point of interest 830 is a position away from the position of the marker 420 in the vertical direction. When the point of interest is thus set and the in-focus point is set at the position of the set point of interest, the in-focus point is located at the center of the in-focus area present above the ground, and the in-focus area that can be effectively used has a size twice as large as that in the case illustrated in FIG. 5. FIG. 10 illustrates a case where a point of interest is set at a position higher than that in the case illustrated in FIG. 9 by taking into consideration the in-focus point being located on the nearer side than the center of the in-focus range of each camera as described with reference to FIG. 4. In this case, the entire in-focus area is present above the ground, and the in-focus area that can be effectively used is larger than that in the case illustrated in FIG. 9. Note that in a case of setting the point of interest immediately above the marker, similar control needs to be performed for each camera, and therefore, processing can be simplified. In a case where, for example, the place where the maker is arranged or the position of the point of interest is limited, the point of interest may be set at a position shifted from immediately above the marker in the horizontal direction.

Figure 11:
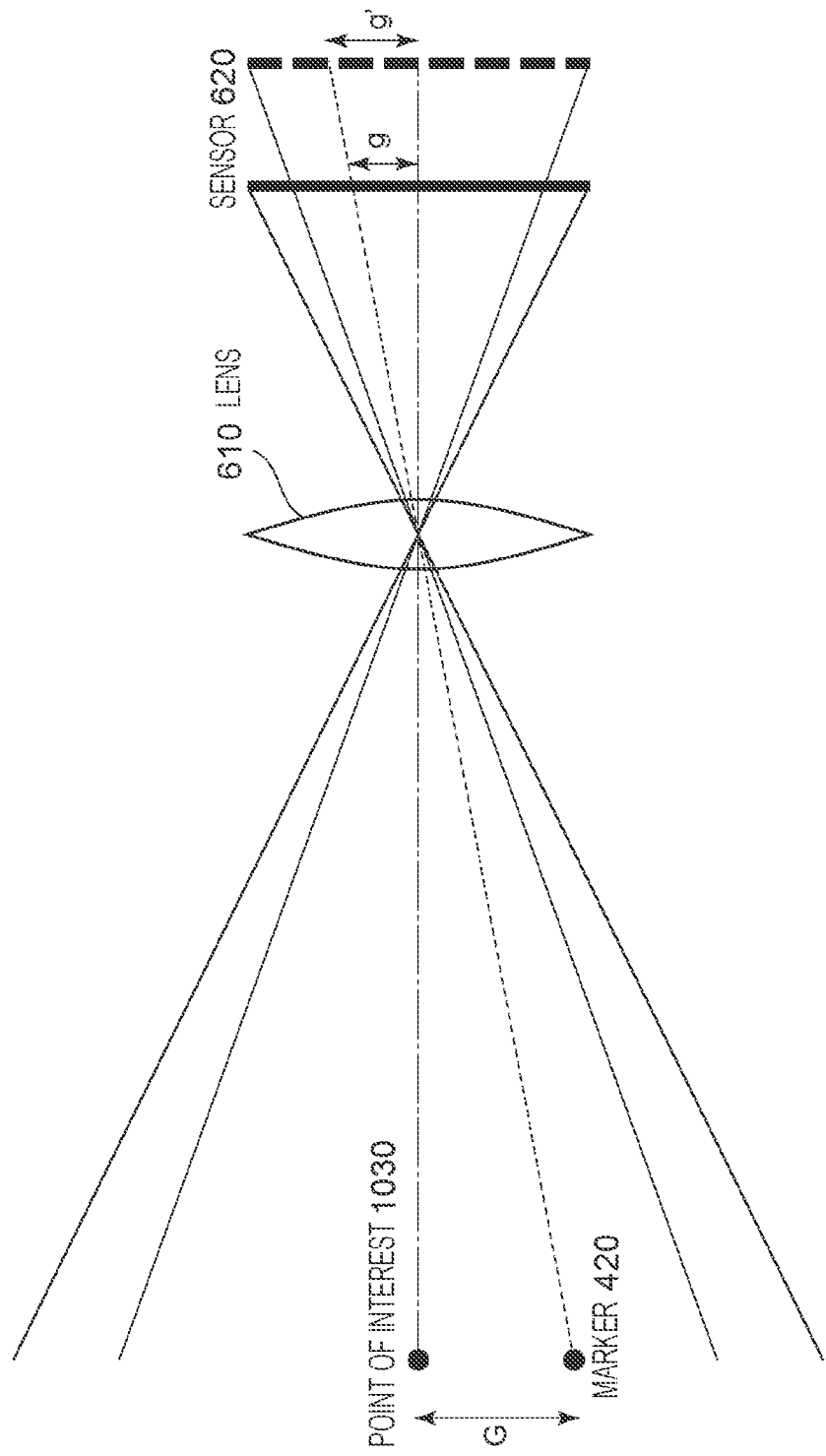
FIG. 11 is a diagram illustrating a relationship between a focal length and the angle of view.

FIG. 11 illustrates a position at which an image of the marker 420 is formed on the sensor 620 when a point of interest is set above the marker 420. The marker 420 and a point of interest 1030 are projected onto the sensor 620, and the height G of the point of interest 1030 corresponds to the length g on the sensor 620. However, the position on the sensor 620 changes in accordance with the zoom value of the lens 610, and the distance g on the sensor 620 for a certain zoom value changes to g' when the zoom value is increased. That is, when the height of the position, from the marker, at which a point of interest is to be set is determined, the position of the marker 420 on the sensor 620 is determined on the basis of the image capture parameter, such as the zoom value.

Figure 12:
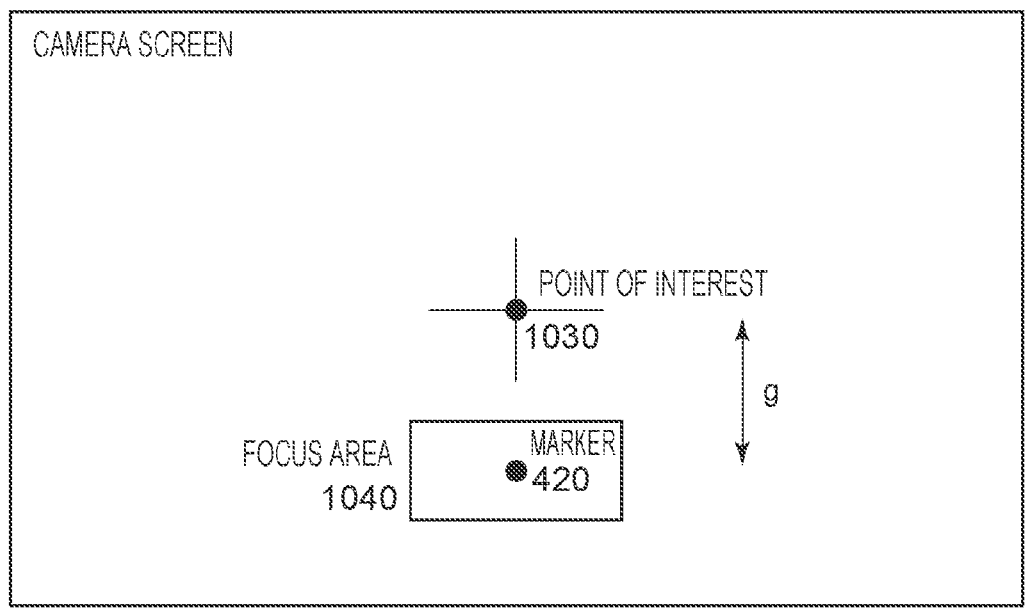
FIG. 12 is a diagram illustrating an example camera screen at the time of focusing.

FIG. 12 illustrates a screen on which a captured image obtained by a camera is displayed. After the distance g between the point of interest and the marker 420 on the sensor 620 has been determined, the position and orientation of the camera are adjusted such that an image of the marker 420 is present at a position away from the center of the sensor 620 by g, so that the point of interest can be set at a position at a desired height. When a focus area 1040 of the camera is set over the marker 420, the in-focus point is set at a position corresponding to the distance from the camera to the marker 420. At this time, the camera is capturing an image obliquely from above the marker 420, and therefore, when the camera is focused on the marker position, the in-focus point is actually at a position slightly further from the camera than the point of interest.

Figure 13:
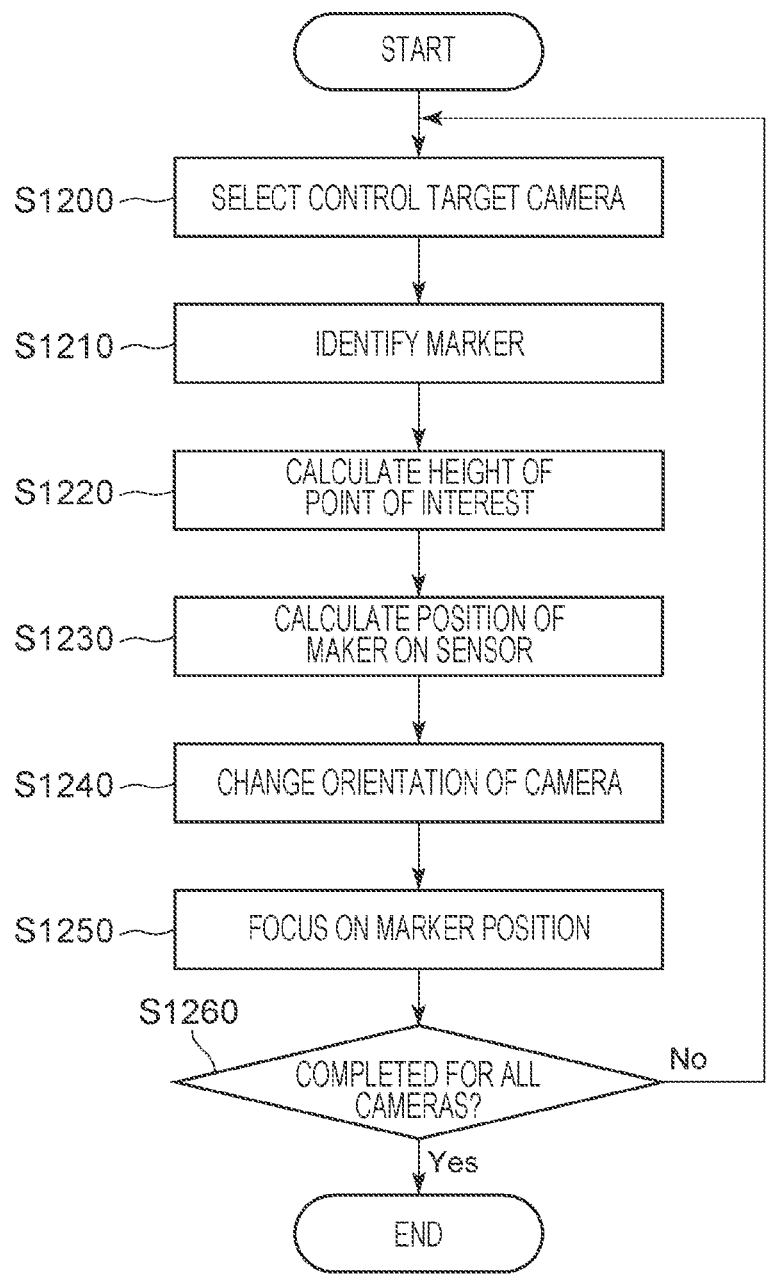
FIG. 13 is a flowchart for describing operations of the control apparatus when a point of interest is set in the air.

Operations of the control apparatus 220 in a case of setting a point of interest in the air are described with reference to FIG. 13. The timing of starting the processing illustrated in FIG. 13 is similar to that for the processing illustrated in FIG. 8. First, in S1200, the control apparatus 220 selects a target camera that is to be a control target from the camera group 100 and obtains the image capture parameter of the target camera. In S1210, the control apparatus 220 uses a captured image obtained from the target camera and information corresponding to a user operation obtained from the UI unit 260 to identify a maker that is a reference for setting a point of interest and that is placed on the ground. In S1220, the in-focus range calculation unit 226 calculates on the basis of the image capture parameter of the target camera, the size of the in-focus area that is hidden below ground in a case where the target camera is focused on the marker. On the basis of the result of calculation, the parameter setting unit 224 sets the height of the point of interest to be set. The height of the point of interest may be set such that the point of interest is at the center of the in-focus area above the ground as illustrated in FIG. 9, may be set such that the size of the in-focus area above the ground is maximized as illustrated in FIG. 10, or may be set to another height.

In S1230, the parameter setting unit 224 calculates the marker position on the sensor corresponding to the set height of the point of interest. In S1240, the command transmission unit 222 gives an instruction for adjusting at least either the position or orientation of the target camera such that the maker position on the sensor comes to a desired position, that is, the position of the point of interest is at the height set in accordance with the image capture parameter. Specifically, the command transmission unit 222 outputs to the target camera an adjustment parameter for changing at least either the position or orientation of the target camera to give an instruction for the adjustment. In S1250, the command transmission unit 222 gives an instruction for changing the focus value of the target camera such that the target camera is focused on the marker position. Note that the control apparatus 220 may focus the target camera on a position, such as the point of interest, other than the marker position. In a case of focusing the target camera on the point of interest, when the height of the point of interest is adjusted within a range such that the position of the marker is included in the in-focus range of the target camera, a virtual-viewpoint image corresponding to an image capture area in the vicinity of the marker can be generated with high image quality.

In S1260, the control apparatus 220 checks whether the processing from S1210 to S1250 is completed for all cameras included in the camera group 100. If the processing is not completed for all cameras, the flow returns to S1200, and the control apparatus 220 selects a camera for which the processing is not yet performed as a control target camera. On the other hand, if the processing is completed for all cameras, the processing in FIG. 13 ends. Note that the case where the control apparatus 220 controls all cameras is described here; however, the control is not limited to this. The control apparatus 220 may perform the processing from S1210 to S1250 for some of the cameras included in the camera group 100.

In the description given above with reference to FIG. 13, the control apparatus 220 sets the position of the point of interest with reference to the position of the maker placed on the ground. Accordingly, the point of interest can be automatically set with precision at an appropriate height corresponding to the in-focus range of the camera. However, the method for setting the position of the point of interest is not limited to this. For example, the marker may be at a position above the ground, or a predetermined feature point extracted from a captured image may be used instead of the marker. Further, the control apparatus 220 may obtain information for identifying the height of the installation position of each camera and control the position of the point of interest on the basis of the obtained information.

In the description given above, the control apparatus 220 outputs to the target camera an instruction for changing the position or orientation of the target camera. With such a method, in a case where the cameras included in the camera group 100 have a motor-driven pan head, the position of the point of interest can be automatically adjusted, and the administrator of the camera group 100 can save time. However, the specifics of the control for adjusting the position or orientation of the target camera by the control apparatus 220 are not limited to this. For example, the control apparatus 220 may display on a display unit or output from an audio output unit, information about a change in at least either the position or orientation of a camera (information indicating that, for example, the orientation of which camera is to be adjusted to what degree). The display unit and the audio output unit may be included in the control apparatus or may be included in a terminal owned by the administrator who installs and adjusts the cameras. With such a method, even in a case where an automatic adjustment of the position or orientation of a camera is not possible, the administrator can appropriately adjust the position or orientation of the camera on the basis of the displayed information or output sound.

As described with reference to FIG. 9 to FIG. 13, the control apparatus 220 according to the present embodiment controls the plurality of cameras that perform image capturing from respective different directions in order to generate a virtual-viewpoint image corresponding to a specified viewpoint. Specifically, the control apparatus 220 obtains an image capture parameter related to image capturing by one or more cameras included in the camera group 100. The control apparatus 220 performs control for adjusting at least either the position or orientation of the target camera corresponding to the obtained image capture parameter such that the position of the point of interest at which the plurality of cameras are pointed is at a height corresponding to the image capture parameter. Accordingly, the in-focus area that is the common part of the in-focus ranges of the respective cameras included in the camera group 100 can be enlarged, and a virtual-viewpoint image of an image capture area in the vicinity of the point of interest can be generated with high image quality by using captured images obtained by the camera group 100. When the point of interest is set in the air and the in-focus point is set at the position of the point of interest, the in-focus area that is present above the ground and that can be effectively used can be made larger than that in the case of setting the point of interest on the ground.

Figure 14:
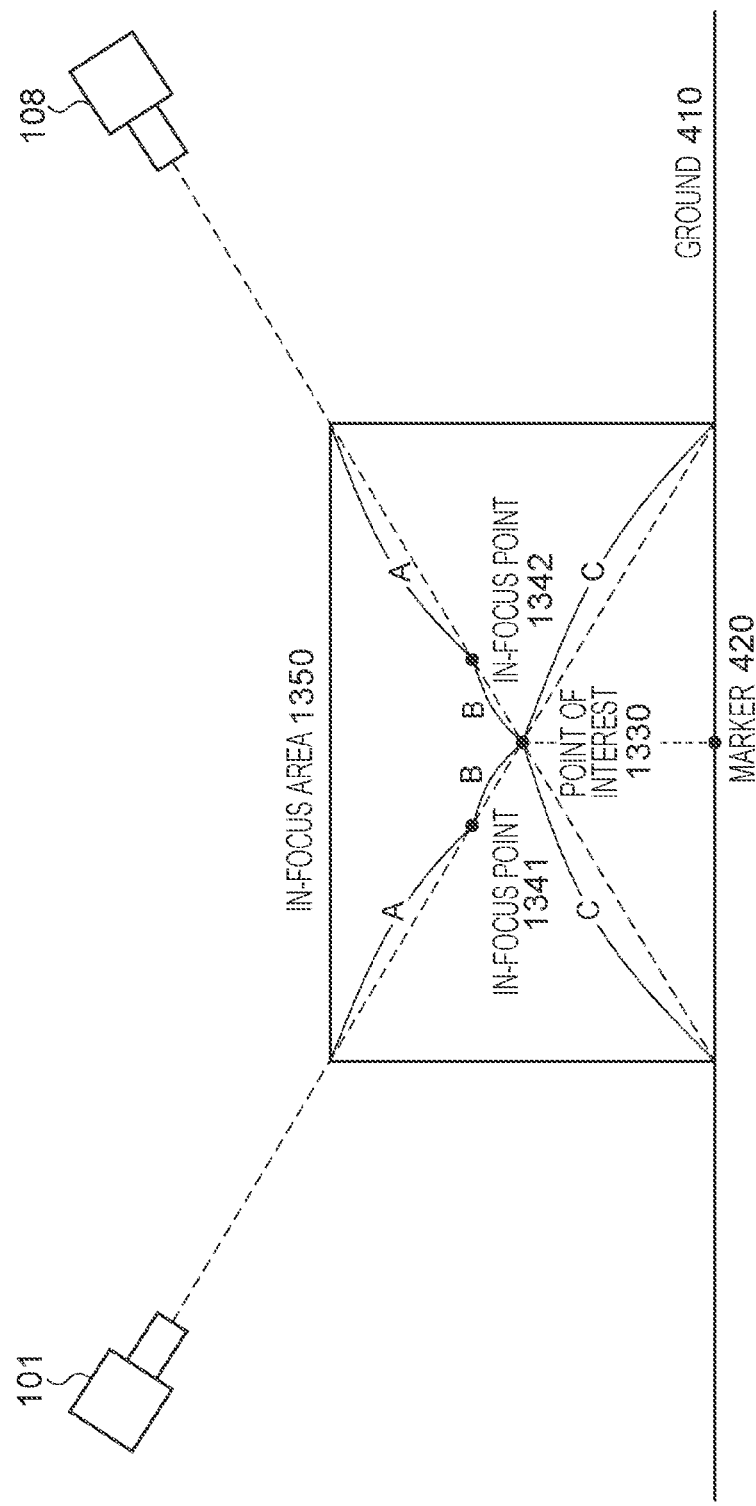
FIG. 14 is a diagram illustrating an in-focus area when a point of interest is set in the air and in-focus points are changed to the near side.

Now, a method for further enlarging an in-focus area by setting a point of interest in the air and further setting an in-focus point closer to the camera than the point of interest is described. FIG. 14 illustrates a case where a point of interest 1330 is set in the air relative to the marker 420 as in FIG. 9 and in-focus points are set at positions closer to the camera than the point of interest 1330 as in FIG. 6. The camera 101 is focused on an in-focus point 1341, the camera 108 is focused on an in-focus point 1342, and the distance from the point of interest 1330 to the rear end of the in-focus range is equal to the length C (=A+B) in FIG. 4. Note that in a case where the distances from the point of interest 1330 to the respective cameras are different, the lengths of A, B, and C are different depending on the camera.

Figure 16:
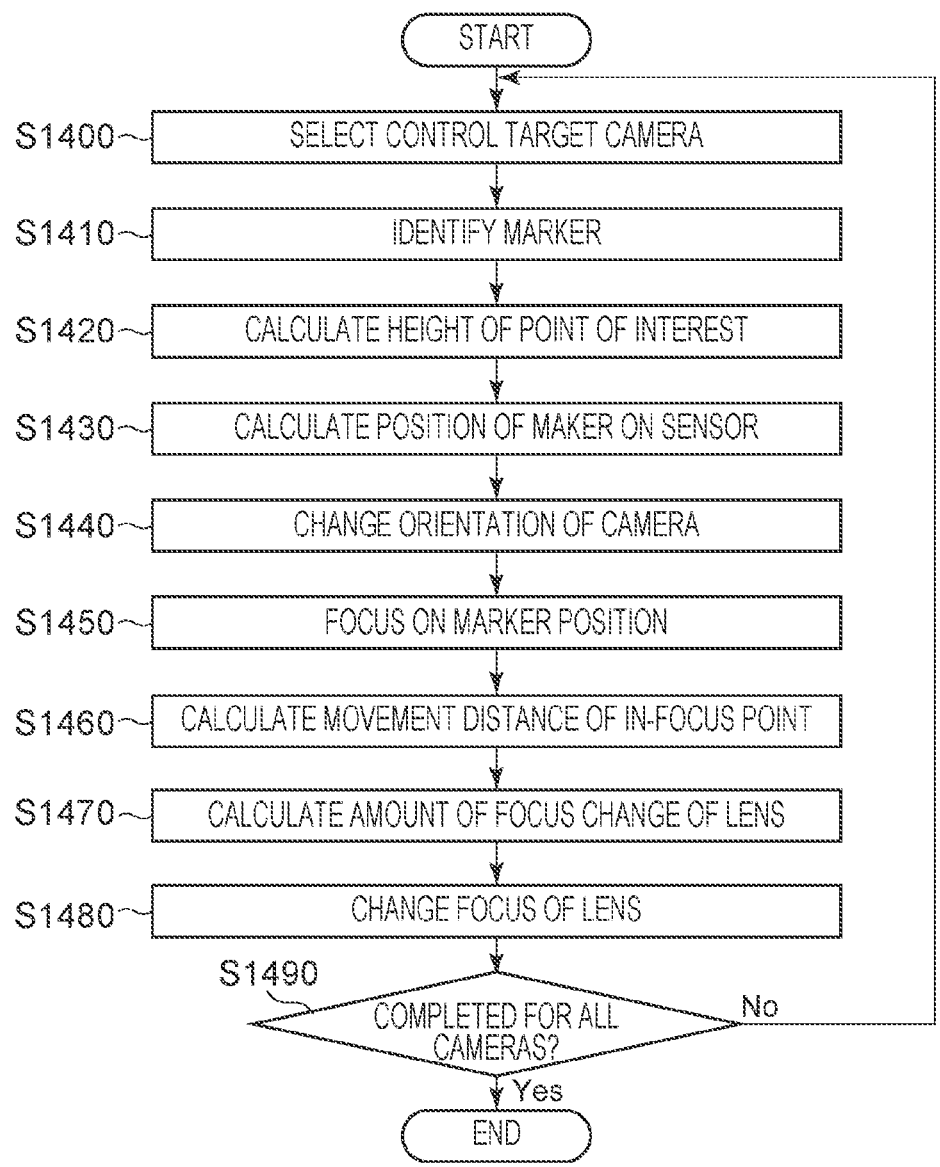
FIG. 16 is a flowchart for describing operations of the control apparatus when a point of interest is set in the air and an in-focus point is changed to the near side.

Operations of the control apparatus 220 in a case of setting an in-focus point as illustrated in FIG. 14 are described with reference to FIG. 16. The timing of starting the processing illustrated in FIG. 16 is similar to that for the processing illustrated in FIG. 8. The processing from S1400 to S1450 is similar to that from S1200 to S1250 in FIG. 13, and the control apparatus 220 controls the position and orientation of the camera such that the point of interest is located above the marker, and focuses the camera on the marker position. The processing from S1460 to S1480 is similar to that from S730 to S750 in FIG. 8, and the control apparatus 220 controls the in-focus point of the target camera such that the in-focus point comes closer to the target camera than the point of interest.

Figure 15:
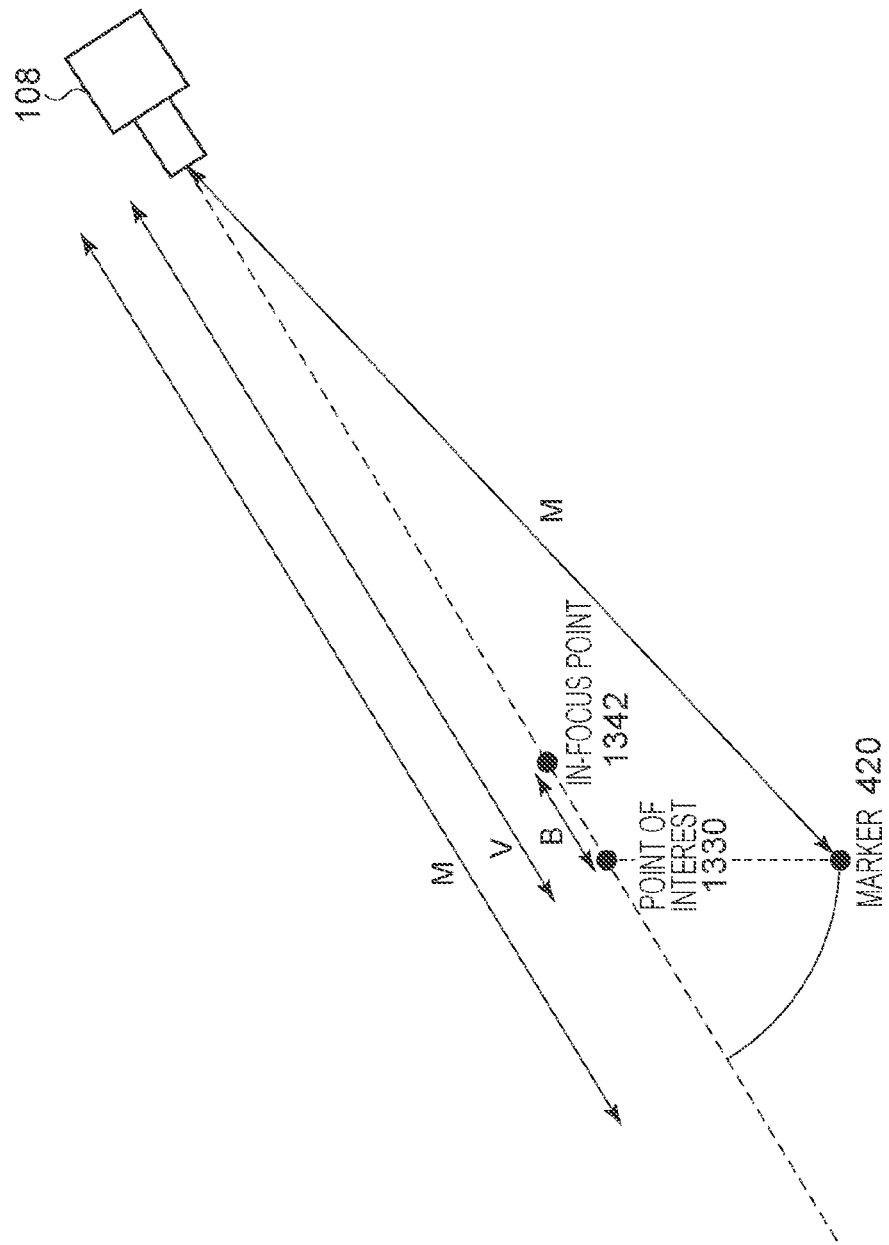
FIG. 15 is a diagram illustrating the amount of movement of an in-focus point when a point of interest is set in the air and the in-focus point is changed to the near side.

However, as illustrated in FIG. 15, the camera 108 is capturing an image of the marker 420 obliquely from above the marker 420. Therefore, the distance M from the camera 108 to the marker 420 is longer than the distance V from the camera 108 to the point of interest 1330. When the camera 108 is focused on the marker position, the in-focus point is at a position further from the camera 108 than the point of interest 1330. The distance from the point of interest 1330 to the in-focus point 1342 after movement is B, and therefore, the amount of movement of the in-focus point in an adjustment made after focusing on the marker 420 is represented by M−V+B. In S1490, the control apparatus 220 checks whether the processing is completed for all cameras. If the processing is not completed for all cameras, the processing is repeated for the number of all cameras. Accordingly, the point of interest is set in the air, the in-focus area hidden below ground can be effectively used, and further, the in-focus range can be used without being wasted.

In S1490, the control apparatus 220 checks whether the processing from S1410 to S1480 is completed for all cameras included in the camera group 100. If the processing is not completed for all cameras, the flow returns to S1400, and the control apparatus 220 selects a camera for which the processing is not yet performed as a control target camera. On the other hand, if the processing is completed for all cameras, the processing in FIG. 16 ends. Note that the case where the control apparatus 220 controls all cameras is described here; however, the control is not limited to this. The control apparatus 220 may perform the processing from S1410 to S1490 for some of the cameras included in the camera group 100.

As described with reference to FIG. 14 to FIG. 16, when a point of interest is set in the air and the in-focus point is set closer to the camera than the point of interest, the in-focus area can be further made larger than that in the case described with reference to FIG. 6 or FIG. 9.

Figure 17:
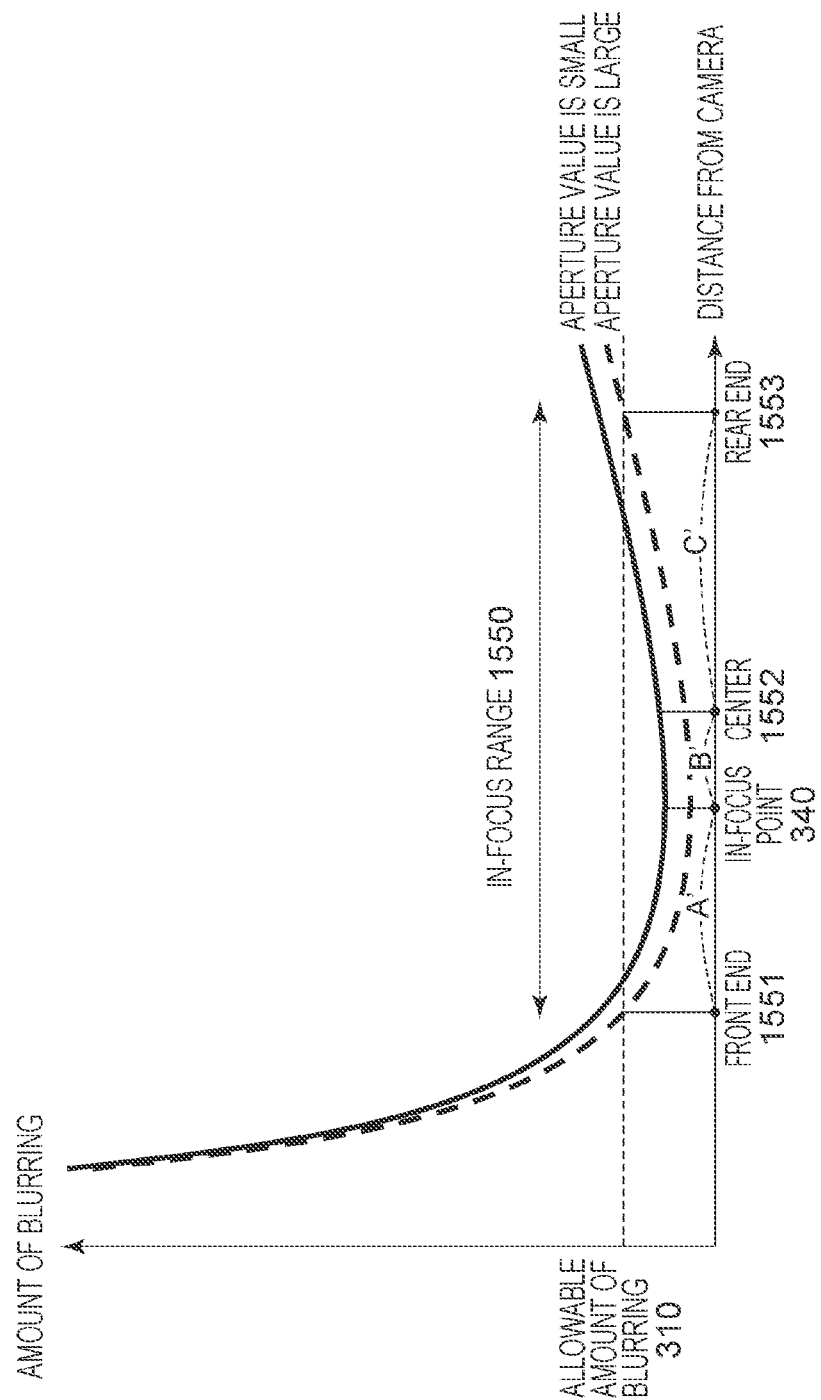
FIG. 17 is a diagram illustrating a relationship between an aperture value and the amount of blurring.

A case where the in-focus area is enlarged by moving the in-focus point or the point of interest is mainly described above on the assumption that the aperture value of the camera is fixed; however, the control apparatus 220 may change the image capture parameter, such as the aperture value, of each camera. As illustrated in FIG. 17, as the aperture value of a camera is changed, the amount of blurring changes. Specifically, when the aperture value is made larger, the amount of blurring becomes smaller than that in a case where the aperture value is small. That is, in a case where the allowable amount of blurring 310 remains unchanged, an in-focus range 1550 is large when the aperture value is large. The control apparatus 220 may use this feature to set the aperture value such that the in-focus area has a desired size.

Figure 18:
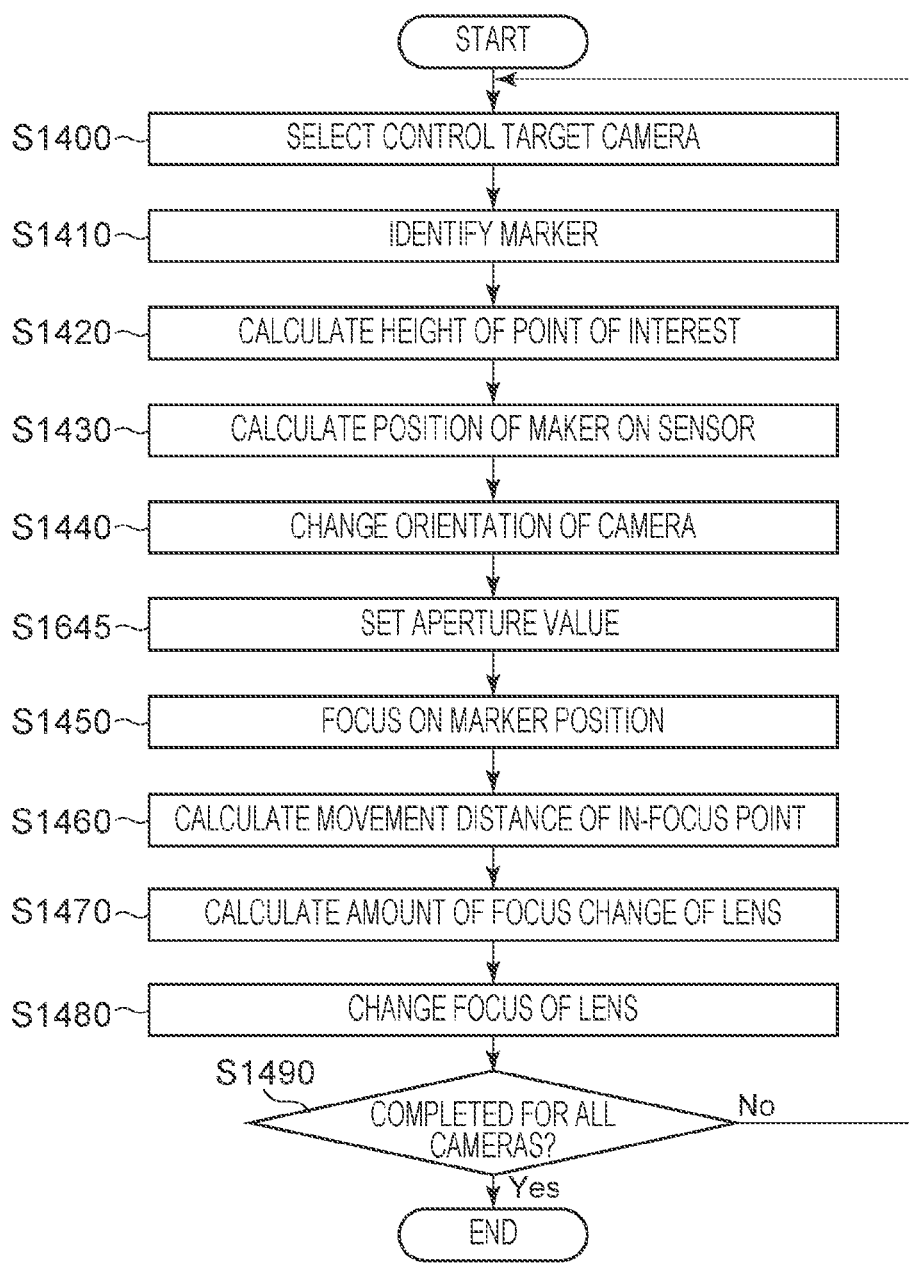
FIG. 18 is a flowchart for describing operations of the control apparatus when an aperture value is changed.

FIG. 18 illustrates an operation flow of the control apparatus 220 in a case of inserting a process for setting the aperture value in the processing flow described with reference to FIG. 16. The control apparatus 220 sets the point of interest of the target camera selected in S1400 by the processing from S1400 to S1440, and subsequently sets the aperture value of the target camera in S1645. In S1645, for example, the parameter obtaining unit 223 obtains the zoom value of the target camera and information indicating a predetermined area in the image capture range that is a target for which a virtual-viewpoint image is generated. The parameter setting unit 224 sets the aperture value on the basis of the obtained information indicating the predetermined area and the obtained zoom value such that the size of the in-focus range becomes larger than the size of the predetermined area, and the command transmission unit 222 gives the target camera an instruction for changing the aperture value. Subsequently, the processing from S1450 to S1490 is performed as in the case illustrated in FIG. 16. Note that the process for setting the aperture value need not be between S1440 and S1450 and may be, for example, between S1480 and S1490. Further, the process for setting the aperture value may be inserted in the processing flow described with reference to FIG. 8 or FIG. 13.

Accordingly, when the control apparatus 220 controls the aperture value of the camera in accordance with control of the point of interest or the in-focus point, the in-focus area can be further enlarged even in a case where the size of the in-focus area does not become sufficiently large only by changing the point of interest or changing the in-focus point. Note that the amount of adjustment of the aperture value is not limited to the above. For example, the aperture value may be specified by the user via the UI unit 260.

Note that in the present embodiment, a case where all cameras included in the camera group 100 are pointed at the same point of interest is mainly described; however, the present embodiment is not limited to this. A plurality of points of interest may be present, and cameras in a first group and cameras in a second group may be pointed at different points of interest. In this case, the processing illustrated in, for example, the above-described flowcharts is performed for each group of cameras that are pointed at the same point of interest.

According to the present disclosure, it is possible to generate a virtual-viewpoint image of high image quality by performing control such that the common part of the in-focus ranges of a plurality of cameras is enlarged.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. A control apparatus for controlling a plurality of image capturing apparatuses that perform image capturing from a plurality of directions in order to generate a virtual-viewpoint image, comprising:
one or more memories storing instructions; and
one or more processors executing the instructions to:
obtain an image capture parameter related to image capturing by one or more image capturing apparatuses included in the plurality of image capturing apparatuses; and
control on the basis of the obtained image capture parameter, an in-focus position, on an optical axis, of a target image capturing apparatus corresponding to the image capture parameter such that a distance from the target image capturing apparatus to the in-focus position of the target image capturing apparatus is shorter than a distance from the target image capturing apparatus to a position that is on the optical axis of the target image capturing apparatus and that is closest to optical axes of the other image capturing apparatuses included in the plurality of image capturing apparatuses.

2. The control apparatus according to claim 1, wherein the in-focus position of the target image capturing apparatus is controlled on the basis of the image capture parameter such that the closest position is included in an in-focus range of the target image capturing apparatus.

3. The control apparatus according to claim 1, wherein the in-focus position of the target image capturing apparatus is controlled on the basis of the image capture parameter such that the closest position corresponds to a center of the in-focus range of the target image capturing apparatus.

4. The control apparatus according to claim 1, wherein the in-focus position of the target image capturing apparatus is controlled by outputting to the target image capturing apparatus an adjustment parameter for changing the in-focus position.

5. The control apparatus according to claim 1, wherein
the one or more processors further execute the instructions to identify a position of a predetermined object located within an image capture range of at least one of the plurality of image capturing apparatuses, and
the in-focus position of the target image capturing apparatus is controlled such that the in-focus position of the target image capturing apparatus matches the identified position of the predetermined object, and subsequently controls the in-focus position of the target image capturing apparatus such that the in-focus position comes closer to the target image capturing apparatus.

6. The control apparatus according to claim 1, wherein
the one or more processors further execute the instructions to:
identify a position of a predetermined object located within an image capture range of at least one of the plurality of image capturing apparatuses, and
perform control for adjusting at least either positions or orientations of the plurality of image capturing apparatuses such that the plurality of image capturing apparatuses are pointed at the identified position of the predetermined object.

7. A control apparatus for controlling a plurality of image capturing apparatuses that perform image capturing from a plurality of different directions in order to generate a virtual-viewpoint image, comprising:
one or more memories storing instructions; and
one or more processors executing the instructions to:
obtain an image capture parameter related to image capturing by one or more image capturing apparatuses included in the plurality of image capturing apparatuses; and
perform control for adjusting at least either a position or an orientation of a target image capturing apparatus corresponding to the obtained image capture parameter such that a position that is on an optical axis of the target image capturing apparatus and that is closest to optical axes of the other image capturing apparatuses included in the plurality of image capturing apparatuses is at a height corresponding to the image capture parameter.

8. The control apparatus according to claim 7, wherein
the one or more processors further execute the instructions to identify a position of a predetermined object located within an image capture range of at least one of the plurality of image capturing apparatuses, and
the control for adjusting at least either the position or the orientation of the target image capturing apparatus is performed on the basis of the identified position of the predetermined object.

9. The control apparatus according to claim 8, wherein the control for adjusting at least either the position or the orientation of the target image capturing apparatus is performed such that the closest position is at a position away from the identified position of the predetermined object in a vertical direction.

10. The control apparatus according to claim 8, wherein the control for adjusting at least either the position or the orientation of the target image capturing apparatus is performed such that the identified position of the predetermined object is included in an in-focus range of the target image capturing apparatus.

11. The control apparatus according to claim 7, wherein the control for adjusting at least either the position or the orientation of the target image capturing apparatus includes a process for outputting to the target image capturing apparatus an adjustment parameter for changing at least either the position or the orientation of the image capturing apparatus.

12. The control apparatus according to claim 7, wherein the control for adjusting at least either the position or the orientation of the target image capturing apparatus includes a process for displaying on a display device, information about a change in at least either the position or the orientation of the image capturing apparatus.

13. The control apparatus according to claim 1, wherein the image capture parameter includes at least one of a zoom value, a focus value, and an aperture value of an image capturing apparatus.

14. The control apparatus according to claim 1, wherein the one or more processors further execute the instructions to control an aperture value of the target image capturing apparatus in accordance with control.

15. A control method for controlling a plurality of image capturing apparatuses that perform image capturing from a plurality of directions in order to generate a virtual-viewpoint image, comprising:
obtaining an image capture parameter related to image capturing by one or more image capturing apparatuses included in the plurality of image capturing apparatuses; and
controlling on the basis of the image capture parameter obtained in the obtaining, an in-focus position, on an optical axis, of a target image capturing apparatus corresponding to the image capture parameter such that a distance from the target image capturing apparatus to the in-focus position of the target image capturing apparatus is shorter than a distance from the target image capturing apparatus to a position that is on the optical axis of the target image capturing apparatus and that is closest to optical axes of the other image capturing apparatuses included in the plurality of image capturing apparatuses.

16. The control method according to claim 15, wherein in the controlling, the in-focus position of the target image capturing apparatus is controlled on the basis of the image capture parameter such that the closest position is included in an in-focus range of the target image capturing apparatus.

17. A control method for controlling a plurality of image capturing apparatuses that perform image capturing from a plurality of directions in order to generate a virtual-viewpoint image, comprising:
obtaining an image capture parameter related to image capturing by one or more image capturing apparatuses included in the plurality of image capturing apparatuses; and
performing control for adjusting at least either a position or an orientation of a target image capturing apparatus corresponding to the image capture parameter obtained in the obtaining such that a position that is on an optical axis of the target image capturing apparatus and that is closest to optical axes of the other image capturing apparatuses included in the plurality of image capturing apparatuses is at a height corresponding to the image capture parameter.

18. The control method according to claim 15, wherein the image capture parameter obtained in the obtaining includes at least one of a zoom value, a focus value, and an aperture value of an image capturing apparatus.

19. A non-transitory computer-readable storage medium storing a program for causing a computer to execute a control method for controlling a plurality of cameras that perform image capturing from a plurality of directions in order to generate a virtual-viewpoint image, comprising:

obtaining an image capture parameter related to image capturing by one or more cameras included in the plurality of cameras; and controlling on the basis of the image capture parameter obtained in the obtaining, an in-focus position, on an optical axis, of a target camera corresponding to the image capture parameter such that a distance from the target camera to the in-focus position of the target camera is shorter than a distance from the target camera to a position that is on the optical axis of the target camera and that is closest to optical axes of the other cameras included in the plurality of cameras.

* * * * *